United States Patent
Forte

[19]
[11] Patent Number: 6,114,024
[45] Date of Patent: Sep. 5, 2000

[54] MULTILAYER BREATHABLE FILM

[75] Inventor: Nicholas F. Forte, Newport News, Va.

[73] Assignee: Kimberly-Clark Worldwide, Inc., Neenah, Wis.

[21] Appl. No.: 08/690,063

[22] Filed: Jul. 31, 1996

Related U.S. Application Data

[60] Provisional application No. 60/001,818, Aug. 1, 1995.
[51] Int. Cl.$^7$ ...................................................... B32B 7/12
[52] U.S. Cl. ..................................... 428/315.9; 428/315.5; 428/315.7; 428/316.6; 428/317.1; 428/317.5; 428/317.9
[58] Field of Search ............................... 428/315.5, 315.7, 428/315.9, 316.6, 317.1, 317.5, 317.9; 604/365, 369

[56] References Cited

U.S. PATENT DOCUMENTS

| | | | |
|---|---|---|---|
| 4,221,624 | 9/1980 | Eslinger et al. | 264/45.9 |
| 4,433,026 | 2/1984 | Molde | 428/315.5 |
| 4,758,239 | 7/1988 | Yeo et al. | 604/366 |
| 4,816,328 | 3/1989 | Saville et al. | 428/316.6 |
| 4,828,556 | 5/1989 | Braun et al. | 604/365 |
| 4,863,788 | 9/1989 | Bellairs et al. | 428/246 |
| 4,929,303 | 5/1990 | Sheth | 156/209 |
| 4,954,388 | 9/1990 | Mallouk et al. | 428/315.5 |
| 5,143,773 | 9/1992 | Takund | 428/137 |
| 5,164,258 | 11/1992 | Shida et al. | 428/319.3 |
| 5,180,628 | 1/1993 | Haardt et al. | 428/316.6 |
| 5,238,732 | 8/1993 | Krishnan | 428/267 |
| 5,352,216 | 10/1994 | Shiono et al. | 604/312 |
| 5,492,741 | 2/1996 | Akao et al. | 428/315.7 |
| 5,523,146 | 6/1996 | Bodford et al. | 428/198 |
| 5,560,974 | 10/1996 | Langley | 428/198 |
| 5,614,310 | 3/1997 | Delgado et al. | 428/317.5 |
| 5,650,225 | 7/1997 | Dutta et al. | 428/315.5 |

FOREIGN PATENT DOCUMENTS

| | | | |
|---|---|---|---|
| 61-284431 | 12/1986 | Japan | 428/315.5 |
| 1315427 | 12/1989 | Japan | 428/316.6 |

*Primary Examiner*—Allan R. Kuhns
*Attorney, Agent, or Firm*—Pillsbury Madison & Sutro LLP

[57] ABSTRACT

Provided is a method of making a stretched, multilayer breathable film having the combination of properties of:

(i) providing a barrier to microorganisms; and
(ii) providing a barrier to blood and bodily fluids;

said method comprising the steps of:

(a) simultaneously extruding at least a five-layer film from a die, said five-layer film having as a minimum the following structure:

C:A:B:A:C;
where B comprises a microporous core layer containing at least one thremoplastic polymer and at least one particulate filler;
C comprises an outer monolithic layer containing a hydrophilic polymeric resin capable of absorbing and desorbing moisture and providing a barrier to aqueous fluids and microorganisms, said C layer being substantially free of particulate filler; and
A comprises a microporous adhesive layer for bonding said C layers to said core layer B, wherein said C layer sustantially prevents the buildup of particulate filler material on said die during said extrusion step;

(b) stretching said extruded five-layer film to thereby form micropores in said microporous core layer and said microporous adhesive layer, wherein said stretching step is conducted and said microporous core layer and said microporous adhesive layers have been formulated so as to provide micropores which allow the passage of gaseous water but substantially prevent the passage of liquid water. The invention also relates to a multilayer film.

12 Claims, 4 Drawing Sheets

MULTILAYER BREATHABLE FILM

Priority to the provisional application Ser. No. 60/001,818, filed on Aug. 1, 1995, is claimed. The complete disclosure of the provisional application is hereby incorporated by reference.

1. FIELD OF THE INVENTION

This invention relates to multilayer breathable films, and more particularly to five-layer breathable films. The invention also relates to a method for making multilayer breathable films.

2. BACKGROUND OF THE INVENTION

Films which allow the transfer of gasses at moderate to high transmission rates are often called breathable. The gasses most commonly used to demonstrate a film's breathability are water vapor, sometimes referred to as moisture vapor, and oxygen. The moisture vapor transmission test (MVTR) and oxygen transmission test (OTR) measure the mass or volume of gas transported across the cross section of the film in a given unit of time at a defined set of environmental conditions. While the mechanism of gas transfer often differs from film to film, it is the total amount of gas that passes through the film which makes films breathable.

When in close proximity to the skin, high MVTR films allow the body to cool itself naturally. When a high MVTR film also provides a barrier to liquid transfer and/or microbial transfer, there are a variety of applications, most of which are in direct or indirect contact with skin, that can take advantage of this unique combination of properties.

Potential applications include surgical gowns, bandages, hospital bed pads, disposable diapers, house wrap, feminine napkins, protective clothing, shoe liners, food packaging, and gloves.

Breathable films can be classified as either microporous or monolithic, depending on their physical makeup and their mechanism of gas transfer.

One type of microporous film consists of a blend of polymers and inorganic fillers which are extruded into a film or sheet using standard fabrication techniques. In a secondary step or in the same continuous process with sequential operations, the sheet or film is oriented or stretched in one or two directions at temperatures below the melting point of the polymer. The result of the input of this mechanical energy into the polymer/filler matrix is the creation of numerous interconnected or closely coupled pores which permit the passage of gas molecules. The density and size of these pores can be controlled by both the selection of raw materials and the conditions at which orientation or stretching occurs.

When a functional microporous film is produced it will allow the passage of gas molecules while not allowing the passage of the liquid from which the gas molecules may have originated.

Another type of microporous film, sometimes referred to as a foamed film, contains the same matrix of interconnected or closely coupled pores previously described except these pores are formed by the release of gasses that are formed under certain conditions of temperature and pressure. These films normally contain a conventional polyolefin as the primary component and a foaming and/or nucleating agent as minor components. The foaming agent is a substance which has significantly higher vapor pressure than the polyolefin at extrusion temperatures. The size and density of the pores can be altered by changing extrusion conditions and the type or concentration of the foaming and/or nucleating agents. These films transport gasses using the same mechanism of diffusion as filler oriented microporous film.

Monolithic breathable films are solid homogeneous fluid barriers which transport gasses via at least one of the mechanisms of absorption, adsorption, diffusion or desorption. These polymers are highly hygroscopic. It is their affinity for water that results in absorption of water in water rich environments. And once saturated, these films will pass water molecules to a moisture lean environment. This type of breathable film transfers water vapor much better than it does oxygen or other gasses.

The above breathable films can be combined to form multilayer breathable films. Examples of such multilayer breathable films are described in the following U.S. Patents.

U.S. Pat. No. 5,164,258 describes a multilayer breathable film consisting of outer layers of a breathable hydrophobic material (microporous), a core hygroscopic barrier layer (monolithic), and adhesive layers disposed between the core layer and the two outer layers. This patent teaches that outer monolithic layers do not work because they absorb water and the outer layer expands. See column 2, lines 12–20.

U.S. Pat. No. 4,828,556 discloses multilayer breathable film consisting of a polyvinyl alcohol monolithic layer disposed between two microporous non-woven web layers. No adhesive is required because the polyvinyl alcohol acts as both the adhesive and the monolithic layer.

U.S. Pat. No. 4,863,788 discloses a multilayer film consisting of a microporous membrane having on one side a continuous film protective layer and on another side a cellular foam adhesive layer and a fabric substrate.

U.S. Pat. No. 4,758,239 discloses a multilayer breathable film consisting of a water soluble polymeric (monolithic) layer having on one side a microporous sheet.

U.S. Pat. No. 5,143,773 discloses a multilayer film consisting of a water absorbing central layer (monolithic) having on one side a water impermeable layer and on another side a microporous layer.

Typically, the multilayer films are extruded. However, when microporous layers containing a filler material are extruded, the filler material collects on the extruder die and inhibits the extrusion process. Usually, after 30 minutes to about an hour of use the filler builds up on the extruder die to such an extent that the extruder must be shut down and the filler material mechanically removed from the extruder die. This is very costly and time consuming. Therefore, there is a great need for multilayer film which when extruded does not cause a build-up of filler material on the extruder die.

For some types of multilayer films, the core is typically the thickest layer and makes up the most material by volume. When monolithic materials are utilized these multilayer films, the core layer usually contains the monolithic material. However, the monolithic layer is very expensive compared to microporous materials. Thus, there is a great need for multilayer material which uses significantly less monolithic material yet provides a sufficient barrier against microorganisms and liquids.

Multilayer breathable films having a monolithic layer have been used in medical films to provide a microbiological barrier to prevent microorganisms from penetrating the material and infecting a medical person contained therein. During certain medical procedures such as open heart surgery, significant amounts of blood and internal fluids are ejected onto the medical gowns of medical personnel. It is very important that these liquids and the microorganisms present therein do not penetrate the material where they can infect the medical personnel.

Thus, there is a great need for a multilayer breathable film which provides a good barrier to microorganisms and internal human fluids, which reduces the amount of monolithic material required, and does not contaminate the extruder die during extrusion.

SUMMARY OF THE INVENTION

It is an objective of the present invention to provide a multilayer breathable film which causes significantly reduced contamination of the die with filler material during extrusion.

Another objective of the present invention is to provide a multilayer film that provides a good biological and liquid barrier while significantly reducing the amount of monolithic material required.

A further objective of the invention is to provide a method of making the multilayer breathable film.

The above objectives and other objectives are surprisingly obtained by the following.

The invention provides a novel multilayer breathable film having the of properties of:
  (i) providing a barrier to microorganisms; and
  (ii) providing a barrier to blood and bodily fluids;
said breathable film comprising at least five-layer film having as a minimum the following structure:
  C:A:B:A:C;
    where B comprises a microporous core layer containing at least one thermoplastic polymer and at least one particulate filler;
    C comprises an outer monolithic layer containing a hydrophilic polymeric resin capable of absorbing and desorbing moisture and providing a barrier to water and microorganisms, said C layer being substantially free of particulate filler; and,
    A comprises a microporous adhesive layer for bonding said C layers to said core layer B, wherein said C layer substantially prevents the buildup of particulate filler material on a die during formation of said multilayer breathable film, and wherein said micropores are constructed and arranged to provide the passage of gaseous water but substantially prevent the passage of liquid water.

The invention also provides a novel method of making a stretched, multilayer breathable film having the combination of properties of:
  (i) providing a barrier to microorganisms; and
  (ii) providing a barrier to blood and bodily fluids;
said method comprising the steps of:
  (a) simultaneously extruding at least a five-layer film from a die, said five-layer film having as a minimum the following structure:
  C:A:B:A:C;
    where B comprises a microporous core layer containing at least one thermoplastic polymer and at least one particulate filler;
    C comprises an outer monolithic layer containing a hydrophilic polymeric resin capable of absorbing and desorbing moisture and providing a barrier to aqueous fluids and microorganisms, said C layer being substantially free of particulate filler; and
    A comprises a microporous adhesive layer for bonding said C layers to said core layer B, wherein said C layer substantially prevents the buildup of particulate filler material on said die during said extrusion step;
  (b) stretching said extruded five-layer film to thereby form micropores in said microporous core layer and said microporous adhesive layer, wherein said stretching step is conducted and said microporous core layer and said microporous adhesive layers have been formulated so as to provide micropores which allow the passage of gaseous water but substantially prevent the passage of liquid water.

DETAILED DESCRIPTION OF PREFERRED EMBODIMENTS

Figure 1D:
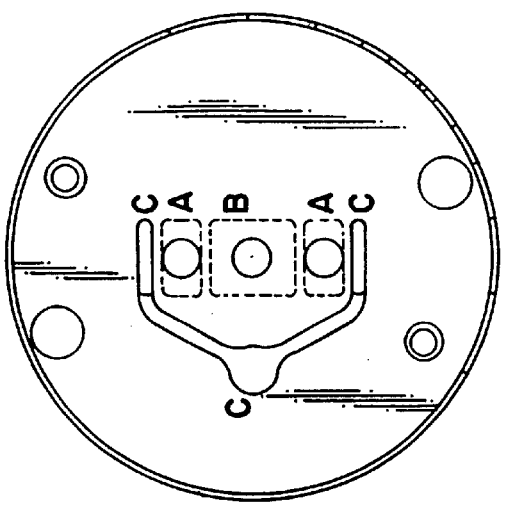
FIG. 1 illustrates a coextrusion flow plate which can be used in the present invention.
Figure 1C:
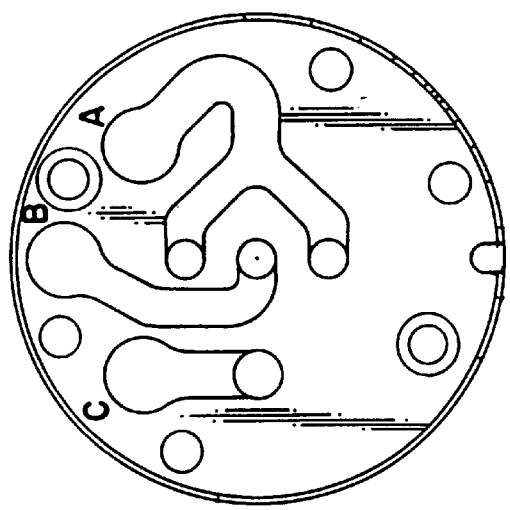
Figure 1B:
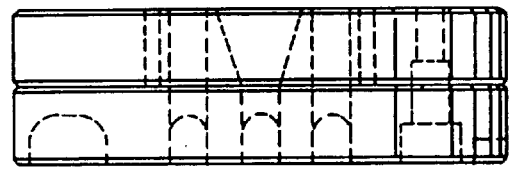
Figure 1A:
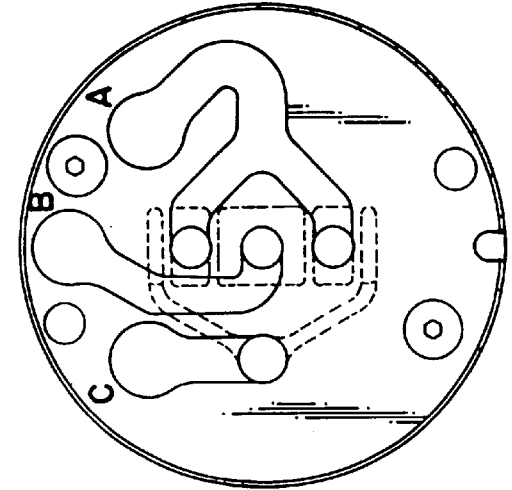

The invention provides a novel multilayer film having the following structure:
  C:A:B:A:C,
    where A comprises a microporous adhesive layer as described herein;
    B comprises a microporous core layer as described herein; and
    C comprises a monolithic layer as described herein.

Suitable thicknesses for each of the layers of the five-layer film have been found to be:
  about 1 to about 40% by volume for each A layer;
  about 1 to about 96% by volume for the B layer; and
  about 1 to about 30% by volume for each C layer, the % volume being based on the volume of the five-layer film.

Preferably, each A layer is about 1 to about 10% by volume; the B layer is about 60% to about 96% by volume; and each C layer is about 1 to about 10% by volume.

More preferably, each A layer is about 1 to about 5% by volume; the B layer is about 80% to about 96% by volume; and each C layer is about 1 to about 5% by volume.

In an alternative embodiment, it is possible to make a three layer breathable film having the following structure:
  C:D:C
    Where each C layer comprises a monolithic layer as described herein; and
    D is a microporous adhesive core layer. The adhesive core layer can contain the materials for making the adhesive layer A described herein. The five-layer film described above is preferred over the three layer film.

In the three layer film, the amount of D can vary from between about 2 to about 98% by volume and the amount of each C layer can vary from about 1 to about 49% by volume. Preferably, the amount of D can vary from between about 80 to about 98% by volume and the amount of each C layer can vary from about 1 to about 10% by volume. Most, preferably, the amount of D can vary from between about 90 to about 98% by volume and the amount of each C layer can vary from about 1 to about 5% by volume.

The multilayer films can be formed to any thickness for the desired application. Examples of suitable film thicknesses are between about 0.3 mils to about 20 mils, preferably about 0.5 mils to about 10 mils, and most preferably about 0.7 to about 3 mils.

Surprisingly, because the novel multilayer breathable films according to this invention contains two outer monolithic layers, the multilayer film can be made remarkably thin, on the order of about 1 mil or less, and yet still provide an effective barrier against microorganisms and bodily fluids.

Microporous Core Layer

The microporous core layer comprises at least a thermoplastic polymer and a particle filler for forming the micropores in the thermoplastic polymer during stretching. Any thermoplastic polymer, or mixtures thereof, which is suitable for forming a film can be used. Examples of suitable thermoplastic polymers are disclosed in U.S. Pat. Nos. 4,929,303 and 5,164,258, which are incorporated herein by reference.

Examples of suitable thermoplastic polymers are polyolefins, polyesters, and polyurethanes. The thermoplastic polymer can contain halogens, such as fluorine. Preferably, the thermoplastic polymer comprises a polyolefin. Specific examples of suitable polyolefins are polypropylene, copolymers of propylene, homopolymers and copolymers of ethylene and other alpha-olefins having from about 3 to about 20 carbon atoms. Linear low density polyethylene ("LLDPE") is particularly preferred.

Preferably, the thermoplastic polymer contains a metallocene catalyzed polyethylene such as the commercially available Exxon 3027 (Exxon). Other examples of suitable metallocene catalyzed polyethylene include:

The Exxon Exceed series, specifically:
350X60; 350X65; 357X80; 363X32; 377X60; 399X60; ECD-103; and ECD-202;
the Exxon Exact series, in particular: 3017; 3022; 3024; 3027; 3030; 3035; 3125; 3128; 3131; 3132; 4003; 4006; 4011; 4015; 4023; 4033; 4041; 4042; 4044; 4049; 4053; 4150; 4151; and 5008;
the Dow Engage series, in particular: 8003; 8100; 8150; 8180; 8200; 8300; 8400; 8401; 8402; 8403; 8411; 8440; 8441; 8445; 8450; 8452; 8480; 8490; 8499; 8500; 8540; 8550; and 8745;
the Dow Affinity series, in particular: HF1030; HM1570; PL1840; PL1845; PL1880; PF1140; FW1650; SM1300; GF1550; PT1450; PL1270; KC8852; SM1350; PL12850; PL1881; SL1170; PT1409; SE1400; and VP1770; and
the BASF Luflexan series, in particular: 0322HX; 0322LX; and 1712SX.

The particulate filler useful for making the micropores in the film can be any inorganic or organic material having a low affinity for and a lower elasticity than the thermoplastic polymer component. Preferably, the particulate filler is a rigid material.

Specific examples of inorganic particulate fillers include:
metal carbonates, such as,
barium carbonate;
calcium carbonate; and
magnesium carbonate;
metal hydroxides, such as,
aluminum hydroxide; and
magnesium hydroxide;
metal oxides, such as,
calcium oxide;
magnesium oxide;
titanium oxide;
titanium dioxide and
zinc oxide;
metal sulfates, such as,
barium sulfate;
calcium sulfate; and
magnesium sulfate;
clay;
kaolin;
talc;
silica;
diatomaceous earth;
alumina
mica
glass powder; and
zeolites. Calcium carbonate is preferred.

Commercial examples of suitable particulate filler concentrates include: Heritage HM-10 (Heritage Plastics); and, Ampacet LR-88250, 100720 and 100719 (Ampacet) These filler concentrates contain the filler, in this case calcium carbonate, at loadings from about 50 to about 75% by weight, and a thermoplastic carrier resin, in this case LLDPE, from about 50 to about 25% by weight.

The average size of the particulate filler should be large enough to form microvoids, but small enough to avoid forming holes or microvoids in adjacent layers during stretching, which are large enough to permit liquids to pass through the adjacent layer. Suitable average particle sizes are about 0.1 micron to about 10 microns, preferably, about 0.5 microns to about 5 microns, and more preferably about 0.8 microns to about 3 microns.

The particulate filler should be used in an amount which provides the desired amount of micropores. A suitable amount of particulate filler is about 30% to about 80% by weight of the layer, preferably, about 50 to about 70% by weight.

The microporous core layer can contain scraps from any of the layers of the multilayer film. For example, the scraps can be mixed with the desired microporous core layer materials and then extruded. The amount of particulate filler present in the scraps should be taken into consideration when determining the amount of particulate filler to be added to the microporous core layer materials.

Outer Monolithic Layers

The outer monolithic layers comprise a hydrophilic polymeric resin. In this manner, water vapor contacting the outer monolithic layer can absorb into one side of the monolithic layer and then desorb out the other side of the monolithic layer. The monolithic layer can comprise any polymeric resin or combination of polymeric resins which is typically used to formulate moisture absorbent monolithic layers. Examples of suitable monolithic layer materials are disclosed in U.S. Pat. No. 5,164,258.

Specific examples of suitable hydrophilic polymeric resins include polyesters, polyamides, and grades of polyvinyl alcohol and ethyl vinyl alcohol which are substantially water insoluble at the ambient working temperature of the stretched film containing them.

Commercial examples of suitable hydrophilic polymeric resins include the Pebax series of resins sold by Elf Atochem, such as 3533, 4033, MV1074, MX1205, MV3000, MV1041, MV6200, X1892, and MH1657; the Hytrel series of resins sold by DuPont, such as 8206, HTR8171, G4778; or Eastman 14766. Preferably the monolithic layer material comprises Hytrel 8206 or Pebax MV1074.

Preferably, the outer monolithic layers include a surface smoothing agent to improve the surface qualities of the film during extrusion. Commercial examples of such surface smoothing agents include the Viton® series of fluoroelastomers from DuPont. To minimize agglomeration and gel formation, these fluoroelastomers should be let down in carrier resins which are similar or identical to the majority resin component in that layer. These types of flow agents can be used in amounts up to about 10,000 ppm, preferably about 200 to about 2000 ppm, by weight of the materials present in the layer.

These free flow agents can also be used in the microporous core and microporous adhesive layers. Specific examples of suitable flow agents that can be used in the microporous layers include Ampacet LR-86769 (3% Viton A in 97% Hexene LLDPE) and Ampacet LR-88249 (3% Viton A in 97% Octene LLDPE) which are manufactured by Ampacet.

Preferably, the selection of the monolithic material and the selection of the thickness of the outer monolithic layers is sufficient to provide an effective barrier to bodily fluids (including blood) and microorganisms. One skilled in the art knows how to test the film barrier resistance to fluids and microorganisms. Based on the disclosure provided herein, one skilled in the art will be easily able to select a desired monolithic material and a desired thickness of the outer monolithic layers. To minimize costs, the thickness of the outer monolithic layers should be as close as possible to the minimum thickness which will still provide an effective barrier to fluids and microorganisms.

Microporous Adhesive Layer

The adhesive layers can be made from any polymeric material which is capable of binding the monolithic layer to the microporous layer. The selection of the adhesive layer will depend on the type of the polymeric materials used for the monolithic and microporous layers. Based on the disclosure herein, one skilled in the art will easily be able to determine what polymeric materials will be suitable for bonding the monolithic layer to the microporous layer.

The adhesive layer which binds the outer monolithic layers to the core microporous layer must allow water vapor to pass therethrough. This can be accomplished by adding a particulate filler to the polymeric material used as the adhesive, whereby when the multilayer film is stretched the adhesive layer becomes microporous in the same manner as the microporous core layer.

Commercial examples of suitable polymeric materials for bonding the outer monolithic layers to the core layer include: Lotader 3210, 3420, and 3410 (Elf Atochem); Orevac 18302 and 18305 (Elf Atochem); Plexar PX5230, PX5298, and PX3342 (Quantum);

The adhesive layer can comprise a mixture of the polymers used in the core layer and the monolithic layers. Preferably, the adhesive layer includes a mixture of recycled or scrap microporous and monolithic layer materials which are combined and extruded. More preferably, the adhesive layer can be made from recycled multilayer films. In this manner, the adhesive layer will already contain a filler material from the microporous core material. Additional, adhesive polymers can be added to optimize the performance of the adhesive layer.

By using scrap or recycled monolithic and microporous material layers as the adhesive, a significant efficiency is achieved. Furthermore, the multilayer film is more easily recycled.

The selection of the materials used for the microporous and monolithic layers will depend on the amount of stretching the multilayer film will be subject to. The stretching must be sufficient to make the thermoplastic polymer/filler mixture and the adhesive material microporous yet not too great that tears or holes in the monolithic layer are formed. One skilled in the art knows how to make a microporous layer, including what amount of stretching is required to provide micropores. Based on the disclosure provided herein, one skilled in the art would easily be able to determine what materials for the monolithic layer should be selected for the particular thermoplastic polymer/filler mixture and adhesive material utilized such that when the multilayer material is stretched, the core layer becomes microporous and the outer monolithic layers retain their integrity.

Formation of Micropores

The core and adhesive layers can be made microporous using industry standard stretching techniques. Preferably, the film is only stretched in the machine direction (hereinafter "monoaxially"). The machine direction is the direction the film is traveling when being formed.

Four factors determine the amount of porosity in the final stretched film:

(1) the quantity, type and size of particulate filler particles;
(2) the type of polymer present in the film layer;
(3) the amount of volatiles present in the film material before extrusion; and
(4) the draw ratio (amount of stretching).

In general, the greater the number of particulate filler particles, the greater the quantity of micropores that can be formed during stretching. The thermoplastic polymer material will form a micropore around most particulate filler particles.

Volatiles present in the material before extrusion can be released during extrusion of the film, to form micropores. Examples of typical volatiles are water and/or organic volatiles. If the quantity of volatiles is too great, the layer may foam or form large easily visible holes in the layer, which are undesirable. Therefore, the amount of volatiles are preferably reduced. Thermoplastic resins preferred for forming microporous films, in general, are very hydrophobic, and therefore a significant amount of water will not be present in the thermoplastic starting materials. However, particulate fillers, such as calcium carbonate, in general are hydrophilic. For example, calcium carbonate concentrates contain about 800 to about 900 ppm of water, before drying. This amount of water is usually too great for use under normal extrusion conditions.

Another source of volatiles is the coating typically present on particulate fillers. For example stearic acid is typically used to coat calcium carbonate. The stearic acid may volatize during the extrusion of the film, and thereby form microvoids. The amount of volatiles released from the organic coating on the particulate filler can be controlled by degassing the mineral during compounding.

The amount of water and/or organic volatiles present in the components before extruding the film should be an amount which is sufficiently low enough to prevent large holes or tears in the layer during the stretching step(s). The amount of water and/or organic volatiles present should be an amount which provides micropores having a diameter of about ⅛ to about ½ of the thickness of the stretched film. The desired amount of water and/or organic volatiles can be easily determined by adjusting the amount of water and/or organic volatiles present in the starting materials used to form the film until the desired size micropores are obtained. A suitable total volatile content for the particulate filler has been found to be between about 100 ppm and about 500 ppm, more preferably between about 100 ppm to about 300 ppm, based on the total weight of the particulate filler. If there is too low a total volatile content, then there may be insufficient micropores formed from the volatization in the film during extrusion to optimize the breathability of the stretched film.

The melt temperature of the film during extrusion will affect the amount of volatization. In general, the higher the melt temperature, the greater the amount of volatization formed during extrusion and the greater the amount of micropores formed.

Method of Making Multilayer Breathable Film

Based on the disclosure provided herein, conventional methods of making multilayer films can easily modified to practice the present invention. For example, the present invention can be practiced using a cast film extrusion method as well as a blown film extrusion method.

The method of making the multilayer breathable film will be described with reference to the drawings. The invention is not limited by the specific methods described in the drawings.

In the method according to the present invention, the multilayer film can be extruded and cooled, and then later heated and stretched to form a breathable multilayer film. Preferably, immediately after extrusion, the multilayer material is stretched before it is cooled (one step method). The extruded film can be stretched by any conventional method, including biaxially and monoaxially. Preferably, the extruded film is only stretched monoaxially in the direction the film is being extruded.

A preferred example of the multilayer film is a 5-layer film comprising a core microporous layer, two outer monolithic layers, and two adhesive layers which bind the outer layers to the core layer.

Figures 4A, 4B, 4C:
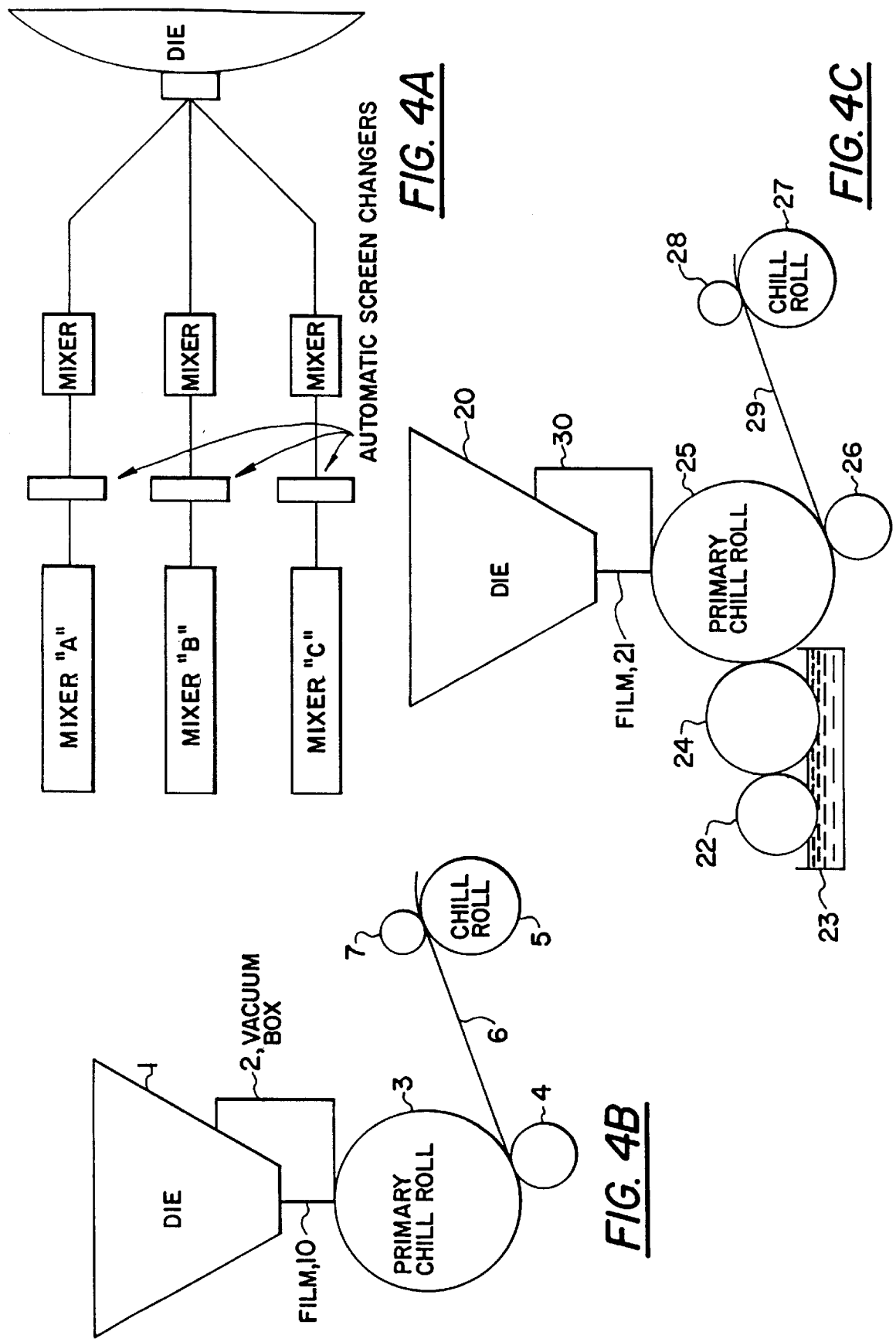
FIG. 4 illustrates two options for orienting or stretching a multilayer film in a continuous or sequential method.

Two examples of suitable methods for stretching a multilayer material immediately upon extrusion in a one step method according to the present invention are shown in FIG. 4.

As shown in FIG. 4, in option 1, the 5-layer film shown at 10, is extruded from the die 1 and passes through a vacuum box 2 where it contacts a primary chill roll 3 and a nip plate out roll 4. The 5-layer material is stretched between the primary chill roll 3 and a secondary chill roll 5. The stretching area is shown as 6.

In option 2 shown in FIG. 4, the polymer film 21 is extruded from the die 20 and passes through a vacuum box 30 where the film contacts the primary chill roll 25 and a nip plate out roll 26. The polymeric film is stretched between the primary chill roll 25 and the secondary chill roll 27. A nip roll 28 keeps film material against second chill roll 27. The stretching area is shown at 29. While polymeric film 21 is contacting the primary chill roll 25, a rubber roll or silicone roll 24 which is coated with water contacts the film 21 to aid in the cooling and release of the film off the primary chill roll 25. Water is provided on the rubber roll 24 by water present in the pan 23. The rubber roll 24 is cleaned using wiper roll 22.

The stretching can be done in more than one step, for example, in two, three, four, or more steps.

The invention also relates to a multilayer film comprising the two outer monolithic layers described herein, the core microporous layer described herein, and the adhesive layers described herein which bind the outer monolithic layers to the core microporous layer.

The multilayer breathable film is suitable for but not limited to use in making surgical gowns, bandages, hospital bed pads, disposable diapers, house wrap, feminine napkins, protective clothing, shoe liners, food packaging, and gloves.

The invention will be further explained by the following non-limiting examples.

EAMPLE 1

Three different resin compositions in the form of unmelted solid pellets were charged into three different extruders, extruder A, extruder B, and extruder C. The particular resin composition that went into each extruder is shown in the following Table I.

TABLE 1

| | | RESIN BLEND | | | |
|---|---|---|---|---|---|
| Extruder "B" | WT % | EXTRUDER "A" | WT % | EXTRUDER "C" | WT % |
| Heritage HM-10 | 70% | Hytrel G4778 | 33% | Hytrel G4778 | 100% |
| Exxon 3027 | 30% | Heritage HM-10 | 47% | | |
| | | Exxon 3027 | 20% | | |
| Thickness "B" (%) | 40 | Thickness* "A" (%) | 20/20 | Thickness* "C" (%) | 10/10 |

Because the "A" and "C" materials are each two layers, the thicknesses listed are the thickness for each layer as a percentage based on the total thickness of the multilayer film produced.

Heritage HM-10 is 75% calcium carbonate and 25% linear low density polyethylene.

Exxon 3027 is metallocene polyethylene.

Hytrel G4778 (DuPont) is a monolithic, elastomeric polyester.

Thus, the "A" layer is the adhesive layer, the "B" layer is the microporous layer, and the "C" layer is the monolithic layer.

The extruders converted the unmelted solid into a liquid state using heat and work. A crammer using an auger loaded the resins into the hopper portion of extruders. The resins were forced through the extruder using a screw. The barrel area of the extruder was divided into regions or zones. Each zone was heated so that the resin was further melted as it passed through the extruder.

The molten resins passed through a screen pack area. Each pack area had a temperature zone. The purpose of the screen pack was to filter out all unmolten materials which may have passed through the extruder such as cardboard, dirt, carbon, etc. The greater the density of the molten resins, the thinner the mesh and greater the head pressure and melt temperature that was used.

From the extruder screws, the molten resins traveled through connecting pipes into an extrusion block. The extrusion block rested on top of the die. The extrusion block is where all of the connecting pipes met and the melt streams were combined in the die via a coextrusion block which is most often referred to as a flow plate. The particular flow plate used is shown in FIG. 1. As shown in FIG. 1, the three molten resins from the connecting pipes passed into three separate holes labeled A, B and C. The molten resins then came out of the five holes on the bottom side of the flow plate as a C:A:B:A:C extrusion with the following percentage volumes: 10/20/40/20/10. The die used had seven heat zones. The heats on the die can be adjusted to vary the gauge.

Figure 3:
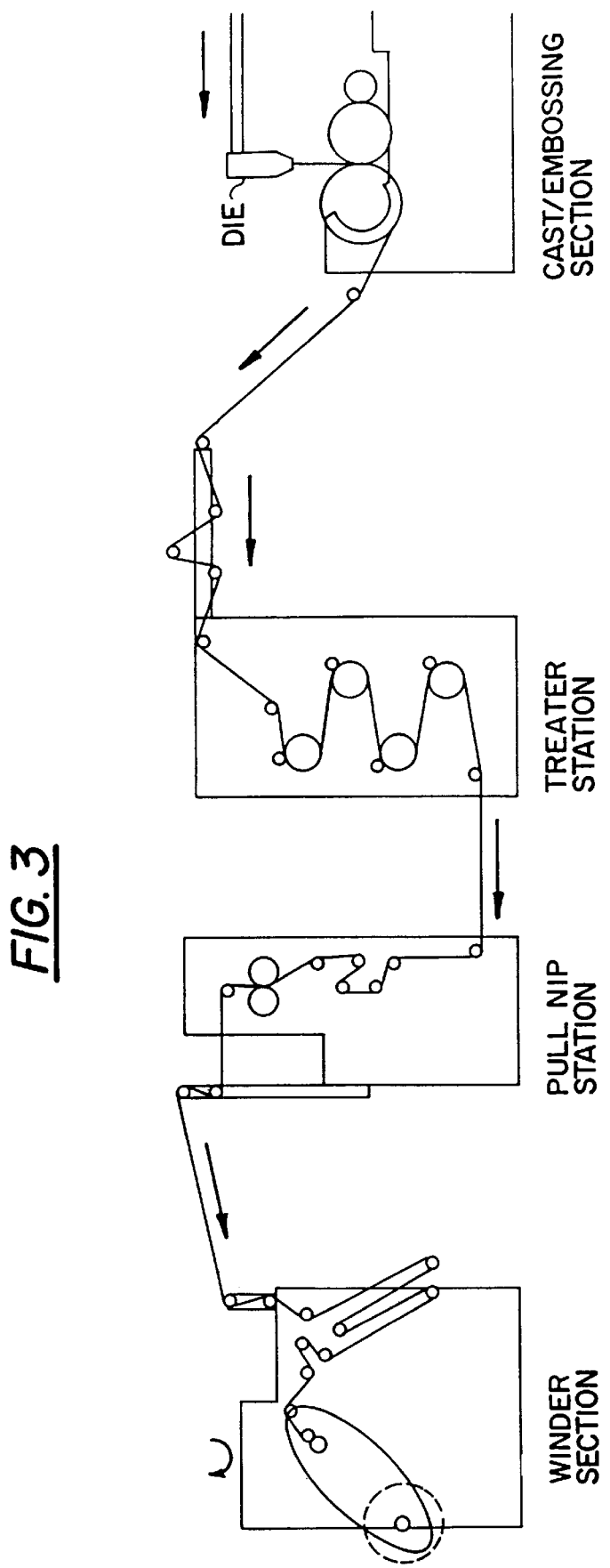
FIG. 3 illustrates a standard cast embossed extrusion line which has been modified to extrude and stretch the multilayer breathable film in one step.

A 5-layer unstretched film was extruded using this method. After being extruded, the 5-layer unstretched film was annealed by passing over the heated rolls shown in FIG. 3. FIG. 3 also shows how the extrusion line can be modified using options 1 or 2, described above, to extrude and stretch the multilayer film in one step.

Figure 2:
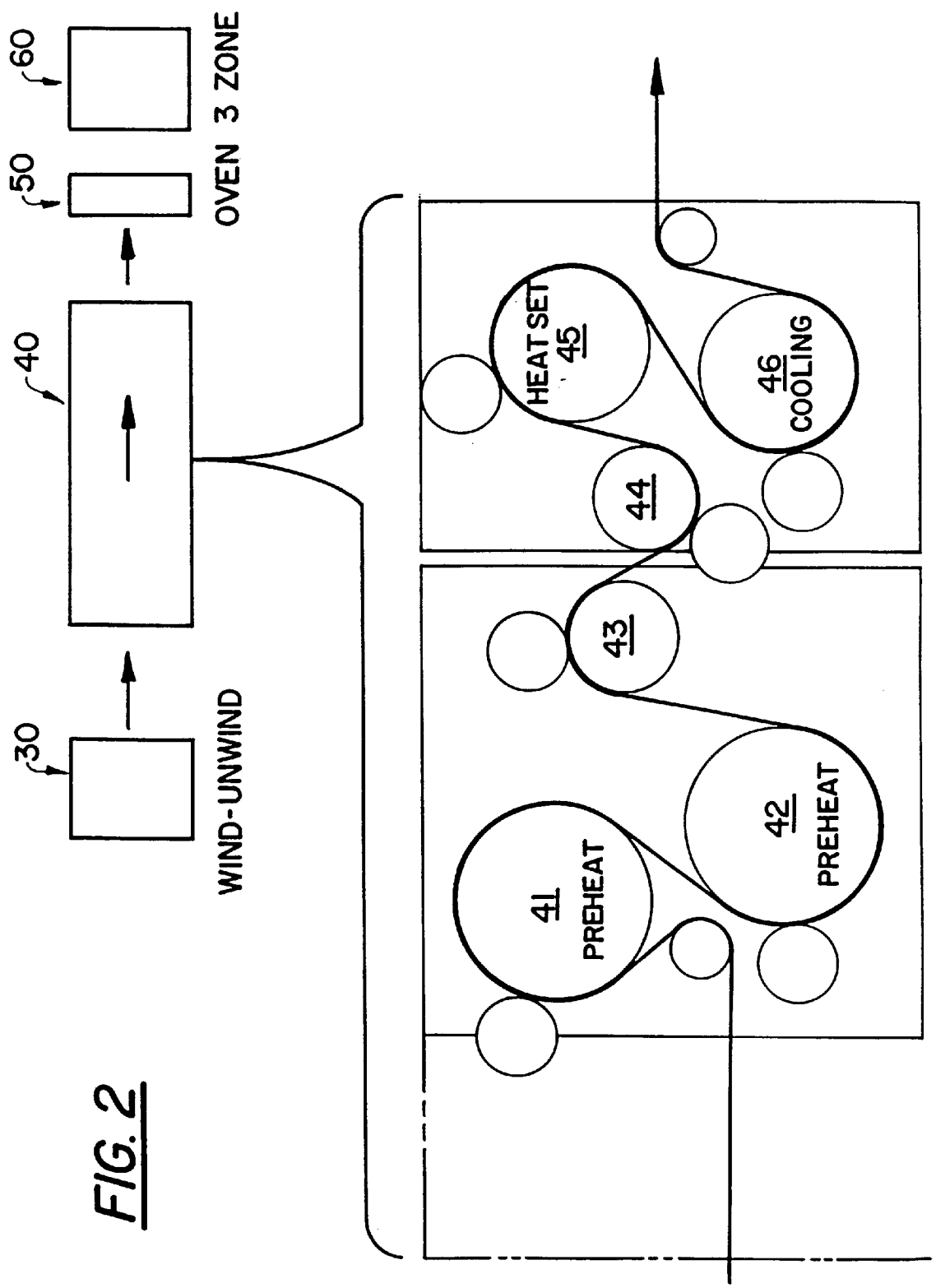
FIG. 2 illustrates a stretching machine which can be used to stretch the multilayer material once it is extruded.

The unstretched film was then taken to a separate machine shown in FIG. 2 for stretching. As shown in FIG. 2, a roll of the unstretched film, shown at 30, was unwound and entered the MDO (Machine Direction and Orientation) process shown at 40. The film in the MDO process 40 was first preheated by passing over two rolls labeled 41 and 42. The film then traveled between roll 43 and a nip, and roll 44 and a nip. The stretching took place between the rolls 43 and 44. Roll 43 was moving slower than roll 44. The ratio of the speeds of the two rolls is known as the draw ratio. The greater the distance between rolls 43 and 44, the greater amount of neck-in which will be seen. Neck-in is the amount of reduction in the width of the film when it is stretched.

After stretching, the film was annealed. Roll 45 is where the annealing process starts to take place. In general, annealing is the way in which dimensional stability is achieved after the stretching process. Annealing was accomplished by first heating the film by passing it over roll 45 and then cooling the film by passing it over roll 46. Together, the heating and cooling causes the stresses in the film to be removed and equilibrium reached. During annealing, an embossing pattern can be applied to the film by compressing the film under high pressure onto an annealing roll which has been engraved with the desired pattern.

The film was then slit, shown at 50, and wound into a final product, shown at 60. A trial run of the material were stretched using the parameters shown in Table 2.

TABLE 2-continued

|  | Trial 1 |
| --- | --- |
| (Roll 44): | |
| Temperature: | 144 |
| Speed: | 58.2 |
| Amps: | 1 |
| Heat Set | |
| (Roll 45): | |
| Temperature: | 162 |
| Speed: | 58.6 |
| Amps: | 1.9 |
| Cooling | |
| (Roll 46): | |
| Temperature: | 64 |
| Speed: | 60.6 |
| Amps: | 2.3 |
| Material Characteristics at Inlet: | |
| Width | 28 |
| Thickness | 3.5 mil |
| Material Characteristics at Exit: | 25 |
| Width | |
| Draw Ratio: | 2.5:1 |

*Nips were always closed and the draw roll gap was always kept to a minimum

The neck-in is the difference between the widths of the multilayer material at the inlet and the exit.

The unstretched multilayer material was translucent. However, once stretched, the material took on an opaque white sheen. Because the material had two outer monolithic layers free of filler material, no buildup of the filler was seen on the extrusion die.

Because the material has two outer monolithic layers, the material provides an effective barrier against microorganisms.

EXAMPLE 2

Example 1 was repeated except using the materials shown in Table 3. The parameters used for stretching the extruded films are shown in Table 4.

TABLE 3

| Extruder "B" | WT % | EXTRUDER "A" | WT % | EXTRUDER "C" | WT % |
| --- | --- | --- | --- | --- | --- |
| Heritage HM-10 | 70% | Pebax X1892 | 33% | Pebax X1892 | 100% |
| Exxon 3027 | 30% | Heritage HM-10 | 47% | | |
| | | Exxon 3027 | 20% | | |
| Thickness "B" (%) | 40 | Thickness "A" (%) | 20/20 | Thickness "C" (%) | 10/10 |

TABLE 2

|  | Trial 1 |
| --- | --- |
| Preheat Temperature (Rolls 41 and 42): | 139 |
| Slow Draw (Roll 43): | |
| Temperature: | 151 |
| Speed: | 23.2 |
| Amps: | 3.9 |
| Fast Draw | |

TABLE 4

|  | Trial 2 | Trial 3 | Trial 4 |
| --- | --- | --- | --- |
| Preheat Temperature (Rolls 41 and 42): | 141 | 141 | 140 |
| Slow Draw (Roll 43): | | | |
| Temperature: | 149 | 149 | 150 |
| Speed: | 38 | 38 | 38 |
| Amps: | 4 | 3.9 | 4 |
| Fast Draw | | | |

TABLE 4-continued

|  | Trial 2 | Trial 3 | Trial 4 |
|---|---|---|---|
| (Roll 44): | | | |
| Temperature: | 146 | 145 | 145 |
| Speed: | 115.5 | 134.8 | 135.0 |
| Amps: | 1.2 | 1.2 | 1.2 |
| Heat Set | | | |
| (Roll 45): | | | |
| Temperature: | 201 | 201 | 200 |
| Speed: | 115.7 | 135 | 135 |
| Amps: | 2.3 | 2.5 | 2.5 |
| Cooling | | | |
| (Roll 46): | | | |
| Temperature: | 67 | 67 | 67 |
| Speed: | 115.8 | 135.5 | 135.8 |
| Amps: | 1.75 | 1.9 | 1.9 |
| Material Characteristics at Inlet: | | | |
| Width | 28 | 28 | 28 |
| Thickness | 3 mil | 3 mil | 3.5 mil |
| Material Characteristics at Exit: | | | |
| Width | 23.75 | 23.5 | 24 |
| Draw Ratio: | 3.0:1 | 3.5:1 | 3.5:1 |

*Nips were always closed and the draw roll gap was always kept to a minimum.

The neck-in is the difference between the widths of the multilayer material at the inlet and the exit.

| PROPERTY | ASTM TEST # | UNITS | |
|---|---|---|---|
| TRIAL 1 | | | |
| GAUGE | D 2103 | mils | 1.97 |
| YIELD | — | in2/lb | 14,030 |
| LIGHT TRANSMISSION | D 1003 | % | 39.1 |
| GLOSS - (A SIDE) | D 2457 | % | 24.0 |
| GLOSS - (B SIDE) | D 2457 | % | 19.7 |
| DART DROP | D 1709 | grams | 278 |
| *STATIC MVTR @ 100° F. 50% Hum. | E96B | g/m$^2$/24 hr | 143 |
| *STATIC MVTR @ 100° F. 50% Hum. | B96BW | g/m$^2$/24 hr | 115 |
| MOCON MVTR @ 100° F. 100% Hum. | — | g/m$^2$/24 hr | 176 |
| M.D. STRIP GAUGE | D 2103 | mils | 1.97 |
| M.D. TENSILE @ BREAK | D 882 | grams | 4,632 |
| M.D. ELONGATION | D 882 | % | 194 |
| M.D. TENSILE @ YIELD | D 882 | grams | 1,325 |
| M.D. ELOGATION @ YIELD | D 882 | % | 5.67 |
| M.D. TENSILE @ 5% | D 882 | grams | 622 |
| M.D. TENSILE @ 10% | D 882 | grams | 1,204 |
| M.D. TENSILE @ 25% | D 882 | grams | 2,369 |
| MD SECANT MODULUS | D 882 | p.s.i. | 14,055 |
| T.D. STRIP GAUGE | D 2103 | mils | 1.98 |
| T.D. TENSILE @ BREAK | D 882 | grams | 1,075 |
| T.P. ELONGATION | D 882 | % | 514 |
| T.D. TENSILE @ YIELD | D 882 | grams | 1,230 |
| T.D. ELOGATION @ YIELD | D 882 | % | 4.86 |
| T.D. TENSILE @ 5% | D 882 | grams | 388 |
| T.D. TENSILE @ 10% | D 882 | grams | 494 |
| T.D. TENSILE @ 25% | D 882 | grams | 560 |
| T.D. SECANT MODULUS | D 882 | p.s.i. | 15,106 |
| C.O.F. - (A/A) | D 1894 | — | 2.72 |
| C.O.F. - (B/B) | D 1894 | — | 2.98 |
| TRIAL 2 | | | |
| GAUGE | D 2103 | mils | 1.26 |
| YIELD | — | in2/lb | 22,430 |
| LIGHT TRANSMISSION | D 1003 | % | 30.3 |
| GLOSS - (A SIDE) | D 2457 | % | 26.3 |
| GLOSS - (B SIDE) | D 2457 | % | 20.9 |
| DART DROP | D 1709 | grams | 238 |
| *STATIC MVTR @ 100° F. 50% Hum. | E96B | g/m$^2$/24 hr | 230 |
| M.D. STRIP GAUGE | D 2103 | mils | 1.26 |
| M.D. TENSILE @ BREAK | D 882 | grams | 4,662 |
| M.D. ELONGATION | D 882 | % | 75 |
| M.D. TENSILE @ YIELD | D 882 | grams | 1,325 |
| M.D. ELOGATION @ YIELD | D 882 | % | 5.67 |
| M.D. TENSILE @ 5% | D 882 | grams | 886 |
| M.D. TENSILE @ 10% | D 882 | grams | 1,759 |
| M.D. TENSILE @ 25% | D 882 | grams | 2,950 |
| MD SECANT MODULUS | D882 | psi | 27,033 |
| T.D. STRIP GAUGE | D 2103 | mils | 1.25 |
| T.D. TENSILE @ BREAK | D 882 | grams | 710 |
| T.D. ELONGATION | D 882 | % | 453 |
| T.D. TENSILE @ YIELD | D 882 | grams | 1,230 |
| T.D. ELOGATION @ YIELD | D 882 | % | 4.86 |
| T.D. TENSILE @ 5% | D 882 | grams | 484 |
| T.D. TENSILE @ 10% | D 882 | grams | 419 |
| T.D. TENSILE @ 25% | D 882 | grams | 479 |
| T.D. SECANT MODULUS | D 882 | p.s.i. | 25,536 |
| C.O.F. - (A/A) | D 1894 | — | 2.59 |
| C.O.F. - (B/B) | D 1894 | — | 1.31 |
| TRIAL 3 | | | |
| GAUGE | D 2103 | mils | 1.13 |
| YIELD | — | in2/lb | 24,021 |
| LIGHT TRANSMISSION | D 1003 | % | 28.9 |
| GLOSS - (A SIDE) | D 2457 | % | 25.4 |
| GLOSS - (B SIDE) | D 2457 | % | 19.7 |
| DART DROP | D 1709 | grams | 238 |
| *STATIC MVTR @ 100° F. 50% Hum. | E96B | g/m2/24 hr | 257 |
| *STATIC MVTR @ 100° F. 50% Hum. | E96BW | g/m2/24 hr | 230 |
| MOCON MVTR @ 100° F. 100% Hum. | — | g/m2/24 hr | 380 |
| M.D. STRIP GAUGE | D 2103 | mils | 1.15 |
| M.D. TENSILE @ BREAK | D 882 | grams | 5,505 |
| M.D. ELONGATION | D 882 | % | 66 |
| M.D. TENSILE @ YIELD | D 882 | grams | 1,325 |
| M.D. ELOGATION @ YIELD | D 882 | % | 5.67 |
| M.D. TENSILE @ 5% | D 882 | grams | 936 |
| M.D. TENSILE @ 10% | D 882 | grams | 1,853 |
| M.D. TENSILE @ 25% | D 882 | grams | 3,450 |
| MD SECANT MODULUS | D 882 | p.s.i. | 30,491 |
| T.D. STRIP GAUGE | D 2103 | mils | 1.12 |
| T.D. TENSILE @ BREAK | D 882 | grams | 656 |
| T.D. ELONGATION | D 882 | % | 473 |
| T.D. TENSILE @ YIELD | D 882 | grams | 1,230 |
| T.D. ELOGATION @ YIELD | D 882 | % | 4.86 |
| T.D. TENSILE @ 5% | D 882 | grams | 357 |
| T.D. TENSILE @ 10% | D 882 | grams | 414 |
| T.D. TENSILE @ 25% | D 882 | grams | 412 |
| T.D. SECANT MODULUS | D 882 | p.s.i. | 24,731 |
| C.O.F. - (A/A) | D 1894 | — | 3.38 |
| C.O.F. - (B/B) | D 1894 | — | 1.54 |
| TRIAL 4 | | | |
| GAUGE | D 2103 | mils | 1.38 |
| YIELD | — | IN$^2$/lb | 18,343 |
| LIGHT TRANSMISSION | D 1003 | % | 32.0 |
| GLOSS - (A SIDE) | D 2457 | % | 25.0 |
| GLOSS - (B SIDE) | D 2457 | % | 20.7 |
| DART DROP | D 1709 | grams | 418 |
| *STATIC MVTR @ 100° F. 50% Hum. | E96B | g/m2/24 hr | 186 |
| M.D. STRIP GAUGE | D 2103 | mils | 1.36 |
| M.D. TENSILE @ BREAK | D 882 | grams | 6,314 |

-continued

| PROPERTY | ASTM TEST # | UNITS | |
|---|---|---|---|
| M.D. ELONGATION | D 882 | % | 111 |
| M.D. TENSILE @ YIELD | D 882 | grams | 1,325 |
| M.D. ELOGATION @ YIELD | D 882 | % | 5.67 |
| M.D. TENSILE @ 5% | D 882 | grams | 935 |
| M.D. TENSILE @ 10% | D 882 | grams | 1,847 |
| M.D. TENSILE @ 25% | D 882 | grams | 3,120 |
| MD SECANT MODULUS | D 882 | p.s.i. | 29,077 |
| T.D. STRIP GAUGE | D 2103 | mils | 1.35 |
| T.D. TENSILE @ BREAK | D 882 | grams | 1,046 |
| T.D. ELONGATION | D 882 | % | 509 |
| T.D. TENSILE @ YIELD | D 882 | grams | 1,230 |
| T.D. ELOGATION @ YIELD | D 882 | % | 4.86 |
| T.D. TENSILE @ 5% | D 882 | grams | 610 |
| T.D. TENSILE @ 10% | D 882 | grams | 526 |
| T.D. TENSILE @ 25% | D 882 | grams | 601 |
| T.D. SECANT MODULUS | D 882 | p.s.i. | 28,347 |
| C.O.F. - (A/A) | D 1894 | — | 1.63 |
| C.O.F. - (B/B) | D 1894 | — | .86 |

*Modified ASTM procedure: no air circulation above the sample.

The results in the Tables labeled Trial 1–4, demonstrate that the multilayer films produced according to this invention exhibit a good moisture vapor transmission rate. All of the films exhibited a moisture vapor transmission rate of 115 to 380 g/m$^2$/24 hr.

The films also exhibited good mechanical characteristics. The tensile strength, elongation, and modulus were sufficiently high such that the material can be used as a component of a reinforced surgical gown. In particular, the tensile strength, elongation, and modulus were significantly higher than those of conventional materials, such as polyethylene, which are used for surgical gowns.

The films exhibited a high puncture resistance as measured by the dart drop test. A high puncture resistance is desirable because during a surgery, if the material is punctured, microorganisms would be able to penetrate the material and infect the medical personnel.

The light transmission test demonstrates that the films blocked more than about 60% of the light, which is desirable to hide the individual or object covered by the film material.

The films exhibited a secant modulus in a range which provides adequate softness, drapability and comfort.

A biological penetration test was performed by TRI/Environmental, Inc., on one sample film made according to Example 1 and one sample film made according to Example 2, using ASTM ES21 and ASTM ES22. Three samples of each sample film were tested. All of the samples passed both ASTM methods after flexing. The ES21 test is a synthetic blood penetration test. The ES22 test is a live microorganism penetration test. Because the film material passed both tests, the film material can be used for surgical gowns.

EXAMPLE 3–7

Example 1 was repeated except using the materials shown in Tables 5–9 The parameters used for stretching the extruded films are shown in Table 10.

TABLE 5

Example 3

| EXTRUDER "B" | WT. % | EXTRUDER "A" | WT. % | EXTRUDER "C" | WT. % |
|---|---|---|---|---|---|
| Ampacet 100720 | 80 | Ampacet 100720 | 80 | Pebax MV3000 | 100 |
| Exxon 357C80 | 20 | Exxon 357C80 | 10 | | |
| | | Pebax MV3000 | 10 | | |
| Thickness "B" (%) | 60.9 | Thickness "A" (%) | 17/17 | Thickness "C" (%) | 0.8/0.8 |

TABLE 6

Example 4

| EXTRUDER "B" | WT. % | EXTRUDER "A" | WT. % | EXTRUDER "C" | WT. % |
|---|---|---|---|---|---|
| Heritage HM-10 | 70 | Ampacet 100719 | 75 | Pebax MV1074 | 100 |
| Exxon 357C80 | 30 | Lotader 3410 | 25 | | |
| Thickness "B" (%) | 64.4 | Thickness "A" (%) | 14.45/14.45 | Thickness "C" (%) | 3.35/3.35 |

TABLE 7

Example 5

| EXTRUDER "B" | WT. % | EXTRUDER "A" | WT. % | EXTRUDER "C" | WT. % |
|---|---|---|---|---|---|
| Heritage HM-10 | 70 | Ampacet 100719 | 75 | Pebax MV1074 | 100 |
| Exxon 357C80 | 30 | Lotader 3410 | 25 | | |
| Thickness "B" (%) | 62.9 | Thickness "A" (%) | 15.15/15.15 | Thickness "C" (%) | 3.45/3.45 |

TABLE 8

Example 6

| EXTRUDER "B" | WT. % | EXTRUDER "A" | WT. % | EXTRUDER "C" | WT. % |
|---|---|---|---|---|---|
| Ampacet 100720 | 80 | Ampacet 100720 | 75 | Ampacet 100720 | 60 |
| Exxon 357C80 | 20 | Exxon 357C80 | 23 | Exxon 357C80 | 37 |
|  |  | Ampacet LR-88162 | 2 | Ampacet LR-86769 | 3 |
| Thickness "B" (%) | 63 | Thickness "A" (%) | 16.5/16.5 | Thickness "C" (%) | 2/2 |

TABLE 9

Example 7

| EXTRUDER "B" | WT. % | EXTRUDER "A" | WT. % | EXTRUDER "C" | WT. % |
|---|---|---|---|---|---|
| Ampacet 100720 | 80 | Ampacet 100720 | 75 | Ampacet 100720 | 60 |
| Exxon 357C80 | 20 | Exxon 357C80 | 23 | Exxon 357C80 | 37 |
|  |  | Ampacet LR-88162 | 2 | Ampacet LR-86769 | 3 |
| Thickness "B" | 63 | Thickness "A" (%) | 16.5/16.5 | Thickness "C" (%) | 2/2 |

TABLE 10

|  | Ex 4 | Ex 5 | Ex 5 | Ex 5 | Ex 3 | Ex 3 | Ex 6 | Ex 7 |
|---|---|---|---|---|---|---|---|---|
| Preheat Temperature | 83 | 83 | 83 | 83 | 85 | 85 | 82 | 82 |
| Slow Draw |  |  |  |  |  |  |  |  |
| Temperature | 155 | 156 | 156 | 156 | 157 | 157 | 155 | 155 |
| Speed | 33.4 | 35 | 35.1 | 35.1 | 32.2 | 32.5 | 35 | 32.2 |
| Amps | 4 | 4.1 | 4 | 4 | 4 | 4 | 4 | 4 |
| Fast Draw |  |  |  |  |  |  |  |  |
| Temperature | 169 | 170 | 170 | 170 | 170 | 171 | 170 | 170 |
| Speed | 120.3 | 124.6 | 131.2 | 131.2 | 119.5 | 127.3 | 174 | 132.6 |
| Amps | 1 | 1 | 1.1 | 1.1 | 1 | 1 | 1 | 1.5 |
| Heat Set |  |  |  |  |  |  |  |  |
| Temperature | 164 | 164 | 164 | 164 | 165 | 164 | 164 | 164 |
| Speed | 120.6 | 124.8 | 131.4 | 131.4 | 119.7 | 127.5 | 174.2 | 132.8 |
| Amps | 2.1 | 2.1 | 2.1 | 2.1 | 2.5 | 2.2 | 2 | 2.5 |
| Cooling Temperature | 63 | 63 | 63 | 63 | 63 | 63 | 63 | 64 |
| Speed | 121.7 | 125.9 | 132.4 | 132.4 | 120.9 | 128 | 174.6 | 133.1 |
| Amps | 1.2 | 1.1 | 1.2 | 1.2 | 1.2 | 1.5 | 1.5 | 1.2 |
| Material Characteristic at Inlet |  |  |  |  |  |  |  |  |
| Width | 28 1/8 | 28 | 28 | 28 | 28 | 28 | 28 | 28 |
| Thickness | 1.5 | 2.25 | 2.25 | 2.25 | 2.25 | 2.25 | 2.2 | 2.25 |
| Material Characteristic at Exit |  |  |  |  |  |  |  |  |
| Width | 25.5 | 25.5 | 25.75 | 25.75 | 24 7/8 | 24 7/8 | 24.5 | 24 7/8 |
| Draw Ratio | 4.0:1 | 4.0:1 | 4.25:1 | 4.5:1 | 4.5:1 | 4.75:1 | 5.0:1 | 5.0:1 |

The unstretched multilayer materials of examples 3–5 were translucent. However, once stretched, the materials took on an opaque white sheen. Because the materials had two outer monolithic layers free of filler material, no buildup of the filler was seen on the extrusion die. Because the materials of examples 3–5 had two outer monolithic layers, the materials provides an effective barrier against microorganisms.

Having two outer monolithic layers separated by a microporous layer provides the added safety that penetration must be made through all three layers before microorganisms can pass therethrough. In contrast, in multilayer materials which have only one core monolithic layer, penetration must only be made through two layers to provide passage of microorganisms which can pass through microporous films.

The properties of the multilayer films (unstretched and stretched) produced in Examples 3–7 were measured. The results are shown in the following Tables.

| Example 3 (unstretched) | | | |
|---|---|---|---|
| PROPERTY | ASTM TEST # | UNITS | |
| GAUGE | D 2103 | mils | 1.60 |
| LIGHT TRANSMISSION | D 1003 | % | 74.4 |
| GLOSS - (STEEL ROLL/OUT) | D 2457 | % | 5.3 |
| GLOSS - (AIR SIDE/IN) | D 2457 | % | 5.1 |
| M.D. STRIP GAUGE | D 2103 | mils | 1.66 |
| M.D. TENSILE @ BREAK | D 882 | grams | 2,022 |
| M.D. ELONGATION | D 882 | % | 544 |
| M.D. TENSILE @ YIELD | D 882 | grams | 982 |
| M.D. ELOGATION @ YIELD | D 882 | % | 8.90 |
| M.D. TENSILE @ 5% | D 882 | grams | 926 |
| M.D. TENSILE @ 10% | D 882 | grams | 979 |
| M.D. TENSILE @ 25% | D 882 | grams | 902 |
| T.D. STRIP GAUGE | D 2103 | mils | 1.63 |
| T.D. TENSILE @ BREAK | D 882 | grams | 1,317 |
| T.D. ELONGATION | D 882 | % | 543 |
| T.D. TENSILE @ YIELD | D 882 | grams | 880 |
| T.D. ELOGATION @ YIELD | D 882 | % | 7.90 |
| T.D. TENSILE @ 5% | D 882 | grams | 842 |
| T.D. TENSILE @ 10% | D 882 | grams | 871 |
| T.D. TENSILE @ 25% | D 882 | grams | 797 |
| C.O.F. - (IN/IN) | D 1894 | — | 1.25 |
| C.O.F. - (OUT/OUT) | D 1894 | — | 1.28 |

| Example 3 (stretched) | | | | | |
|---|---|---|---|---|---|
| PROPERTY | ASTM TEST # | UNITS | 4.5:1 | 4.75:1 | 4.95:1 |
| YIELD | — | in$^2$/lb | 41,299 | 43,765 | 40,956 |
| GAUGE | D 2103 | mils | 0.69 | 0.63 | 0.71 |
| LIGHT TRANSMISSION | D 1003 | % | 33.2 | 33.8 | 30.9 |
| GLOSS - (A SIDE) | D 2457 | % | 10.9 | 11.4 | 12.0 |
| GLOSS - (B SIDE) | D 2457 | % | 10.5 | 10.6 | 12.2 |
| DART DROP | D 1709 | grams | 95 | 72 | 78 |
| MVTR (UPRIGHT/INVERTED) | E 96B/E96BW | g/m$^2$/day | 3,285/4,061 | 3,444/4,062 | 3,410/4,077 |
| M.D. STRIP GAUGE | D 2103 | mils | 0.70 | 0.62 | 0.70 |
| M.D. TENSILE @ BREAK | D 882 | grams | 1,955 | 1,979 | 2,069 |
| M.D. ELONGATION | D 882 | % | 58 | 53 | 48 |
| M.D. TENSILE @ 5% | D 882 | grams | 306 | 287 | 347 |
| M.D. TENSILE @ 10% | D 882 | grams | 569 | 549 | 647 |
| M.D. TENSILE @ 25% | D 882 | grams | 1,209 | 1,231 | 1,463 |
| M.D. SECANT MODULUS | D 882 | p.s.i | 23,120 | 24,520 | 24,690 |
| T.D. STRIP GAUGE | D 2103 | mils | 0.69 | 0.62 | 0.71 |
| T.D. TENSILE @ BREAK | D 882 | grams | 206 | 192 | 189 |
| T.D. ELONGATION | D 882 | % | 369 | 318 | 309 |
| T.D. TENSILE @ 5% | D 882 | grams | 78 | 74 | 69 |
| T.D. TENSILE @ 10% | D 882 | grams | 117 | 113 | 109 |
| T.D. TENSILE @ 25% | D 882 | grams | 151 | 147 | 148 |
| T.D. ELOGATION @ YIELD | D 882 | % | 38 | 34 | 31 |
| T.D. TENSILE @ YIELD | D 882 | grams | 155 | 151 | 151 |
| T.D. SECANT MODULUS | D 882 | p.s.i. | 8,880 | 9,049 | 7,888 |
| C.O.F. - (A/A) | D 1894 | — | 0.86 | 0.86 | 0.86 |
| C.O.F. - (B/B) | D 1894 | — | 0.78 | 0.79 | 0.83 |

In examples 3–9, the ASTM tests E96B and E96BW were all run at 100° F. to emulate the temperature of the Human Body. Furthermore, ASTM E96BW was run without circulation of air.

| Example 4 (unstretched) | | | |
|---|---|---|---|
| PROPERTY | ASTM TEST # | UNITS | |
| GAUGE | D 2103 | mils | 1.25 |
| LIGHT TRANSMISSION | D 1003 | % | 79.1 |
| GLOSS - (STEEL ROLL/OUT) | D 2457 | % | 4.8 |
| GLOSS - (AIR SIDE/IN) | D 2457 | % | 4.9 |
| M.D. STRIP GAUGE | D 2103 | mils | 1.25 |
| M.D. TENSILE @ BREAK | D 882 | grams | 1,544 |
| M.D. ELONGATION | D 882 | % | 474 |
| M.D. TENSILE @ YIELD | D 882 | grams | ***** |
| M.D. ELOGATION @ YIELD | D 882 | % | ***** |

-continued

| | | | |
|---|---|---|---|
| M.D. TENSILE @ 5% | D 882 | grams | 747 |
| M.D. TENSILE @ 10% | D 882 | grams | 780 |
| M.D. TENSILE @ 25% | D 882 | grams | 803 |
| T.D. STRIP GAUGE | D 2103 | mils | 1.21 |
| T.D. TENSILE @ BREAK | D 882 | grams | 1,146 |
| T.D. ELONGATION | D 882 | % | 541 |
| T.D. TENSILE @ YIELD | D 882 | grams | 683 |
| T.D. ELOGATION @ YIELD | D 882 | % | 5.21 |
| T.D. TENSILE @ 5% | D 882 | grams | 682 |
| T.D. TENSILE @ 10% | D 882 | grams | 668 |
| T.D. TENSILE @ 25% | D 882 | grams | 650 |
| C.O.F. - (IN/IN) | D 1894 | — | 1.19 |
| C.O.F. - (OUT/OUT) | D 1894 | — | 1.26 |

Example 4 (stretched)

| PROPERTY | ASTM TEST # | UNITS | 4.0:1 | 4.1:1 | 4.25:1 |
|---|---|---|---|---|---|
| YIELD | — | in²/lb | 54135 | 570825 | 610272 |
| GAUGE | D 2103 | mils | .52 | 0.49 | 0.48 |
| LIGHT TRANSMISSION | D 1003 | % | 42.8 | 42.7 | 42.2 |
| GLOSS - (A SIDE) | D 2457 | % | 10.5 | 10.6 | 10.8 |
| GLOSS - (B SIDE) | D 2457 | % | 10.5 | 10.7 | 11.2 |
| DART DROP | D 1709 | grams | <30 | <30 | <30 |
| MVTR (UPRIGHT/INVERTED) | E 96B/E96BW | g/m²/day | 1,032/750 | 2,146/1,411 | 2,578/2,337 |
| M.D. STRIP GAUGE | D 2103 | mils | 0.52 | 0.52 | 0.49 |
| M.D. TENSILE @ BREAK | D 882 | grams | 1,528 | 1,410 | 1,553 |
| M.D. ELONGATION | D 882 | % | 49 | 47 | 43 |
| M.D. TENSILE @ 5% | D 882 | grams | 306 | 282 | 314 |
| M.D. TENSILE @ 10% | D 882 | grams | 582 | 534 | 600 |
| M.D. TENSILE @ 25% | D 882 | grams | 1,262 | 1,165 | 1,332 |
| M.D. SECANT MODULUS | D 882 | p.s.i | 19,088 | 29,840 | 31,780 |
| T.D. STRIP GAUGE | D 2103 | mils | 0.54 | 0.48 | 0.50 |
| T.D. TENSILE @ BREAK | D 882 | grams | 148 | 152 | 134 |
| T.D. ELONGATION | D 882 | % | 97 | 132 | 47 |
| T.D. TENSILE @ 5% | D 882 | grams | 96 | 88 | 83 |
| T.D. TENSILE @ 10% | D 882 | grams | 129 | 129 | 118 |
| T.D. TENSILE @ 25% | D 882 | grams | 143 | 145 | 134 |
| T.D. ELOGATION @ YIELD | D 882 | % | 21 | 19 | 18 |
| T.D. TENSILE @ YIELD | D 882 | grams | 143 | 144 | 133 |
| T.D. SECANT MODULUS | D 882 | p.s.i. | 10,138 | 15,357 | 11,400 |
| C.O.F. - (A/A) | D 1894 | — | 0.55 | 0.46 | 0.95 |
| C.O.F. - (B/B) | D 1894 | — | 0.54 | 0.46 | 0.90 |

Example 5 (unstretched)

| PROPERTY | ASTM TEST # | UNITS | |
|---|---|---|---|
| GAUGE | D 2103 | mils | 2.0 |
| LIGHT TRANSMISSION | D 1003 | % | 72.7 |
| GLOSS - (STEEL ROLL/OUT) | D 2457 | % | 6.0 |
| GLOSS - (AIR SIDE/IN) | D 2457 | % | 6.3 |
| M.D. STRIP GAUGE | D 2103 | mils | 1.96 |
| M.D. TENSILE @ BREAK | D 882 | grams | 2,341 |
| M.D. ELONGATION | D 882 | % | 515 |
| M.D. TENSILE @ YIELD | D 882 | grams | 1,220 |
| M.D. ELOGATION @ YIELD | D 882 | % | 29.50 |
| M.D. TENSILE @ 5% | D 882 | grams | 1,192 |
| M.D. TENSILE @ 10% | D 882 | grams | 1,218 |
| M.D. TENSILE @ 25% | D 882 | grams | 1,225 |
| T.D. STRIP GAUGE | D 2103 | mils | 1.90 |
| T.D. TENSILE @ BREAK | D 882 | grams | 1,849 |
| T.D. ELONGATION | D 882 | % | 551 |
| T.D. TENSILE @ YIELD | D 882 | grams | 1,104 |
| T.D. ELOGATION @ YIELD | D 882 | % | 5.21 |
| T.D. TENSILE @ 5% | D 882 | grams | 1,101 |
| T.D. TENSILE @ 10% | D 882 | grams | 1,081 |
| T.D. TENSILE @ 25% | D 882 | grams | 1,045 |
| C.O.F. - (IN/IN) | D 1894 | — | 1.34 |
| C.O.F. - (OUT/OUT) | D 1894 | — | 1.29 |

Example 5 (stretched)

| PROPERTY | ASTM TEST # | UNITS | 4.0:1 | 4.25:1 | 4.5:1 |
|---|---|---|---|---|---|
| YIELD | — | in²/lb | 35,113 | 37,024 | 40,905 |
| GAUGE | D 2103 | mils | 0.83 | 0.75 | 0.69 |
| LIGHT TRANSMISSION | D 1003 | % | 33.1 | 33.4 | 32.9 |
| GLOSS - (A SIDE) | D 2457 | % | 11 | 11.7 | 11 |

-continued

| | | | | | |
|---|---|---|---|---|---|
| GLOSS - (B SIDE) | D 2457 | % | 11.6 | 10.8 | 12.4 |
| DART DROP | D 1709 | grams | 85 | 71 | 71 |
| MVTR (UPRIGRT/INVERTED) | E 96B/E96BW | g/m$^2$/day | 330/270 | 488/304 | 517/485 |
| M.D. STRIP GAUGE | D 2103 | mils | 0.82 | 0.67 | 0.69 |
| M.D. TENSILE @ BREAK | D 882 | grams | 2,470 | 2,370 | 2,433 |
| M.D. ELONGATION | D 882 | % | 81 | 50 | 37 |
| M.D. TENSILE @ 5% | D 882 | grams | 436 | 434 | 468 |
| M.D. TENSILE @ 10% | D 882 | grams | 800 | 824 | 882 |
| M.D. TENSILE @ 25% | D 882 | grams | 1,619 | 1,840 | 2,055 |
| M.D. SECANT MODULUS | D 882 | p.s.i | 28,583 | 15,603 | 33,770 |
| T.D. STRIP GAUGE | D 2103 | mils | 0.82 | 0.73 | 0.69 |
| T.D. TENSILE @ BREAK | D 882 | grams | 283 | 225 | 187 |
| T.D. ELONGATION | D 882 | % | 309 | 281 | 194 |
| T.D. TENSILE @ 5% | D 882 | grams | 176 | 132 | 116 |
| T.D. TENSILE @ 10% | D 882 | grams | 224 | 181 | 161 |
| T.D. TENSILE @ 25% | D 882 | grams | 241 | 196 | 180 |
| T.D. ELOGATION @ YIELD | D 882 | % | 24 | 19 | 18 |
| T.D. TENSILE @ YIELD | D 882 | grams | 241 | 198 | 179 |
| T.D. SECANT MODULUS | D 882 | p.s.i. | 17,750 | 17,247 | 15,577 |
| C.O.F. - (A/A) | D 1894 | — | 0.94 | 0.95 | 0.93 |
| C.O.F. - (B/B) | D 1894 | — | 0.92 | 0.97 | 0.91 |

Example 6 (unstretched)

| PROPERTY | ASTM TEST # | UNITS | |
|---|---|---|---|
| GAUGE | D 2103 | mils | 2.25 |
| LIGHT TRANSMISSION | D 1003 | % | 57.9 |
| GLOSS - (STEEL ROLL/OUT) | D 2457 | % | 5.5 |
| GLOSS - (AIR SIDE/IN) | D 2457 | % | 5.5 |
| M.D. STRIP GAUGE | D 2103 | mils | 2.26 |
| M.D. TENSILE @ BREAK | D 882 | grams | 2,867 |
| M.D. ELONGATION | D 882 | % | 569 |
| M.D. TENSILE @ YIELD | D 882 | grams | 1,325 |
| M.D. ELOGATION @ YIELD | D 882 | % | 5.67 |
| M.D. TENSILE @ 5% | D 882 | grams | 1,319 |
| M.D. TENSILE @ 10% | D 882 | grams | 1,228 |
| M.D. TENSILE @ 25% | D 882 | grams | 1,132 |
| T.D. STRIP GAUGE | D 2103 | mils | 2.26 |
| T.D. TENSILE @ BREAK | D 882 | grams | 2,071 |
| T.D. ELONGATION | D 882 | % | 563 |
| T.D. TENSILE @ YIELD | D 882 | grams | 1,230 |
| T.D. ELOGATION @ YIELD | D 882 | % | 4.86 |
| T.D. TENSILE @ 5% | D 882 | grams | 1,227 |
| T.D. TENSILE @ 10% | D 882 | grams | 1,093 |
| T.D. TENSILE @ 25% | D 882 | grams | 1,041 |
| C.O.F. - (IN/IN) | D 1894 | — | .48 |
| C.O.F. - (OUT/OUT) | D 1894 | — | .46 |

Example 6 (stretched)

| PROPERTY | ASTM TEST # | UNITS | 5.0:1 | 5.25:1 |
|---|---|---|---|---|
| YIELD | — | in$^2$/lb | 38,849 | 39,591 |
| GAUGE | D 2103 | mils | 0.84 | 0.87 |
| LIGHT TRANSMISSION | D 1003 | % | 22.5 | 21.1 |
| GLOSS - (A SIDE) | D 2457 | % | 10.9 | 9.8 |
| GLOSS - (B SIDE) | D 2457 | % | 9.6 | 12.0 |
| DART DROP | D 1709 | grams | 100 | 72 |
| MVTR (UPRIGHT/INVERTED) | E 96B/E96BW | g/m$^2$/day | 3,727/4,013 | 3,829/4,018 |
| M.D. STRIP GAUGE | D 2103 | mils | 0.83 | 0.85 |
| M.D. TENSILE @ BREAK | D 882 | grams | 2,483 | 2,530 |
| M.D. ELONGATION | D 882 | % | 34 | 27 |
| M.D. TENSILE @ 5% | D 882 | grams | 513 | 585 |
| M.D. TENSILE @ 10% | D 882 | grams | 1,006 | 1,135 |
| M.D. TENSILE @ 25% | D 882 | grams | 2,250 | 2,220 |
| M.D. SECANT MODULUS | D 882 | p.s.i | 29,010 | 32,300 |
| T.D. STRIP GAUGE | D 2103 | mils | 0.81 | 0.81 |
| T.D. TENSILE @ BREAK | D 882 | grams | 226 | 209 |
| T.D. ELONGATION | D 882 | % | 398 | 381 |
| T.D. TENSILE @ 5% | D 882 | grams | 74 | 67 |
| T.D. TENSILE @ 10% | D 882 | grams | 122 | 110 |
| T.D. TENSILE @ 25% | D 882 | grams | 164 | 158 |
| T.D. ELOGATION @ YIELD | D 882 | % | 26 | 27 |
| T.D. TENSILE @ YIELD | D 882 | grams | 164 | 159 |
| T.D. SECANT MODULUS | D 882 | p.s.i. | 7,032 | 7,500 |
| C.O.F. - (A/A) | D 1894 | — | 0.40 | 0.39 |
| C.O.F. - (B/B) | D 1894 | — | 0.43 | 0.42 |

-continued

| Example 7 (unstretched) | | | |
|---|---|---|---|
| PROPERTY | ASTM TEST # | UNITS | |
| GAUGE | D 2103 | mils | 2.25 |
| LIGHT TRANSMISSION | D 1003 | % | 59.4 |
| GLOSS - (STEEL ROLL/OUT) | D 2457 | % | 5.7 |
| GLOSS - (AIR SIDE/IN) | D 2457 | % | 5.5 |
| M.D. STRIP GAUGE | D 2103 | mils | 2.30 |
| M.D. TENSILE @ BREAK | D 882 | grams | 3,068 |
| M.D. ELONGATION | D 882 | | 563 |
| M.D. TENSILE @ YIELD | D 882 | grams | 1,348 |
| M.D. ELOGATION @ YIELD | D 882 | % | 5.75 |
| M.D. TENSILE @ 5% | D 882 | grams | 1,340 |
| M.D. TENSILE @ 10% | D 882 | grams | 1,267 |
| M.D. TENSILE @ 25% | D 882 | grams | 1,166 |
| T.D. STRIP GAUGE | D 2103 | mils | 2.30 |
| T.D. TENSILE @ BREAK | D 882 | grams | 2,258 |
| T.D. ELONGATION | D 882 | % | 569 |
| T.D. TENSILE @ YIELD | D 882 | grams | 1,248 |
| T.D. ELOGATION @ YIELD | D 882 | % | 4.74 |
| T.D. TENSILE @ 5% | D 882 | grams | 1,245 |
| T.D. TENSILE @ 10% | D 882 | grams | 1,136 |
| T.D. TENSILE @ 25% | D 882 | grams | 1,065 |
| C.O.F. - (IN/IN) | D 1894 | — | .54 |
| C.O.F. - (OUT/OUT) | D 1894 | — | .50 |

| Example 7 (stretched) | | | |
|---|---|---|---|
| PROPERTY | ASTM TEST # | UNITS | 5.0:1 |
| YIELD | — | in$^2$/lb | 33866 |
| GAUGE | D 2103 | mils | 0.91 |
| LIGHT TRANSMISSION | D 1003 | % | 22.2 |
| GLOSS - (A SIDE) | D 2457 | % | 10.8 |
| GLOSS - (B SIDE) | D 2457 | % | 11.4 |
| DART DROP | D 1709 | grams | 112 |
| MVTR (UPRIGHT/INVERTED) | E 96B/E96BW | g/m$^2$/day | 3,779/4,077 |
| M.D. STRIP GAUGE | D 2103 | mils | 0.91 |
| M.D. TENSILE @ BREAK | D 882 | grams | 2,742 |
| M.D. ELONGATION | D 882 | % | 46 |
| M.D. TENSILE @ 5% | D 882 | grams | 425 |
| M.D. TENSILE @ 10% | D 882 | grams | 805 |
| M.D. TENSILE @ 25% | D 882 | grams | 1,822 |
| M.D. SECANT MODULUS | D 882 | p.s.i | 23,860 |
| T.D. STRIP GAUGE | D 2103 | mils | 0.92 |
| T.D. TENSILE @ BREAK | D 882 | grams | 255 |
| T.D. ELONGATION | D 882 | % | 410 |
| T.D. TENSILE @ 5% | D 882 | grams | 80 |
| T.D. TENSILE @ 10% | D 882 | grams | 126 |
| T.D. TENSILE @ 25% | D 882 | grams | 177 |
| T.D. ELOGATION @ YIELD | D 882 | % | 33 |
| T.D. TENSILE @ YIELD | D 882 | grams | 179 |
| T.D. SECANT MODULUS | D 882 | p.s.i. | 8,152 |
| C.O.F. - (A/A) | D 1894 | — | 0.29 |
| C.O.F. - (B/B) | D 1894 | — | 0.32 |

The results in the Tables labeled Examples 3–5 demonstrate that the multilayer films produced according to this invention exhibit a good moisture vapor transmission rate. All of the films exhibited a moisture vapor transmission rate of 270 to 4077 g/m$^2$/24 hr.

The films also exhibited good mechanical characteristics. The tensile strength, elongation, and modulus were sufficiently high such that the material can be used as a component of a reinforced surgical gown. In particular, the tensile strength, elongation, and modulus were significantly higher than those of conventional materials, such as polyethylene, which are used for surgical gowns.

The films exhibited a high puncture resistance as measured by the dart drop test. A high puncture resistance is desirable because during a surgery, if the material is punctured, microorganisms would be able to penetrate the material and infect the medical personnel.

The light transmission test demonstrates that the films blocked more than about 60% of the light, which is desirable to hide the individual or object covered by the film material.

The films exhibited a secant modulus in a range which provides adequate softness, drapability and comfort.

A biological penetration test was performed by Nelson Laboratories, Inc. (Salt Lake City, Utah) on some of the films of Examples 3 and 5, using ASTM ES22 (now ASTM F1671). Three samples of each sample film were tested. The ES22 test is a live microorganism penetration test Two films of Example 3, stretched at a draw ratio of 4:1, and 4.95, passed the blood barrier test ASTM ES22

A biological penetration test was performed by Nelson Laboratories, Inc. (Salt Lake City, Utah) on some of the films of Examples 3–5, using ASTM ES21 (now ASTM F1670). Three samples of each sample film were tested. The ES21 test is a blood penetration test The stretched films of Example 3, at a draw ratio of 4.5:1 and 4.95:1 passed the ES21 test. The stretched films of Example 4, at a draw ratio of 4:1 and 4.25:1 did not pass. It is believed that the size of the particulate filler was too great for the thin films of Example 4 and therefore the large particles penetrated the surrounding layers. The stretched films of Example 5 at a draw ratio of 4.5: and 4:1 passed.

From the above data, the percentage of microvoids formed was calculated using the following formula:

$$\% \ Voids = \frac{(Yield \ Factor)_{Actual} - (Yield \ Factor)_{0\% \ Voids}}{(Yield \ Factor)_{Actual}}$$

The results of the calculations are shown in following tables.

% Voids Calculation for Example 3

| Actual Yield (in²/lb) | Actual Gauge (mils) | Yield Factor (in²/lb) | Draw Ratio | % Voids (%) |
|---|---|---|---|---|
| 12469 | 1.6 | 19950 | 1:1 | 0 |
| 41299 | 0.69 | 28496 | 4.5:1 | 30 |
| 43765 | 0.63 | 27572 | 4.75:1 | 27.6 |
| 40956 | 0.71 | 29079 | 4.95:1 | 31.4 |

% Voids Calculation for Example 4

| Actual Yield (in²/lb) | Actual Gauge (mils) | Yield Factor (in²/lb) | Draw Ratio | % Voids (%) |
|---|---|---|---|---|
| 15960 | 1.25 | 19950 | 1:1 | 0 |
| 54135 | 0.52 | 28150 | 4:1 | 29.1 |
| 57082 | 0.49 | 27970 | 4.1:1 | 28.7 |
| 61027 | 0.48 | 29293 | 4.25:1 | 31.9 |

% Voids Calculation for Example 5

| Actual Yield (in²/lb) | Actual Gauge (mils) | Yield Factor (in²/lb) | Draw Ratio | % Voids (%) |
|---|---|---|---|---|
| 9975 | 2. | 19950 | 1:1 | 0 |
| 35113 | 0.83 | 29144 | 4:1 | 31.5 |
| 37024 | 0.75 | 27768 | 4.25:1 | 28.2 |
| 40905 | 0.69 | 28224 | 4.5:1 | 29.3 |

To demonstrate that the microporous layers can be stretched at greater draw ratios to form a greater volume percentage of voids, the Examples 6 and 7 were performed % Voids Calculation for Example 6

| Actual Yield (in²/lb) | Actual Gauge (mils) | Yield Factor (in²/lb) | Draw Ratio | % Voids (%) |
|---|---|---|---|---|
| 8867 | 2.25 | 19950 | 1:1 | 0 |
| 38849 | 0.84 | 32633 | 5:1 | 38.9 |
| 39591 | 0.87 | 34444 | 5.25:1 | 42 |

% Voids Calculation for Example 7

| Actual Yield (in²/lb) | Actual Gauge (mils) | Yield Factor (in²/lb) | Draw Ratio | % Voids (%) |
|---|---|---|---|---|
| 8867 | 2.25 | 19950 | 1:1 | 0 |
| 33866 | 0.91 | 30818 | 5:1 | 35.3 |

While the invention has been described in detail and with reference to specific embodiments thereof, it will be apparent to one skilled in the art that various changes can be made therein without departing from the spirit and scope of the claimed invention.

I claim:

1. A multilayer breathable film having the of properties of:
   (i) providing a barrier to microorganisms; and
   (ii) providing a barrier to blood and bodily fluids;
   said breathable film comprising at least a five-layer film having as a minimum the following structure:
   C:A:B:A:C;
   where B comprises a microporous core layer containing at least one thermoplastic polymer and at least one particulate filler;
   C comprises an outer monolithic layer containing a hydrophilic polymeric resin capable of absorbing and desorbing moisture and providing a barrier to water and microorganisms, said C layer being substantially free of particulate filler; and,
   A comprises a microporous adhesive layer for bonding said outer monolithic layers to said microporous core layer, wherein said outer monolithic layers substantially prevent the buildup of particulate filler material on a die during formation of said multilayer breathable film, and wherein said microporous core layer and said microporous adhesive layers contain micropores, said micropores being constructed and arranged to provide the passage of gaseous water but substantially prevent the passage of liquid water.

2. A film according to claim 1, wherein at least one of said microporous adhesive layers comprises said thermoplastic polymer of said microporous core layer and said hydrophilic polymeric resin of said monolithic layers.

3. A film according to claim 1, wherein said layers have the following volume ratio:
   about 1 to about 40% by volume for each said microporous adhesive layer;
   about 1 to about 96% by volume for said microporous core layer; and
   about 1 to about 30% by volume for each said outer monolithic layer, the volume % being based on the total volume of said breathable film.

4. A film according to claim 1, wherein said layers have the following volume ratio:
   about 1 to about 10% by volume for each said microporous adhesive layer;
   about 60 to about 96% by volume for said said microporous core layer; and
   about 1 to about 10% by volume for each said outer monolithic layer, the volume % being based on the total volume of said breathable film.

5. A film according to claim 1, wherein said layers have the following volume ratio:
   about 1 to about 5% by volume for each said microporous adhesive layer;

about 80 to about 96% by volume for said said microoorous core layer; and about 1 to about 50% by volume for each said outer monolithic layer, the volume % being based on the total volume of said breathable film.

6. A film according to claim 1, wherein said breathable film has a thickness of about 1 mil or less.

7. A film according to claim 1, wherein said microporous core layer or said microporous adhesive layers have been made by the steps of determining the volatile content in the materials for making said microporous core layer and said microporous adhesive layers; and adjusting the amount of volatiles in said materials to provide micropores having an average diameter of about ⅛ to about ½ the thickness of a stretched microporous core layer or stretched microporous adhesive layers.

8. A film according to claim 1, wherein said microporous core layer or said microporous adhesive layers have been made by the steps of determining the water content in said particulate filler for making said microporous core layer and said microporous adhesive layers; and adjusting the amount of water in said materials to provide micropores having an average diameter of about ⅛ to about ½ the thickness of a stretched microporous core layer or stretched microporous adhesive layers.

9. A film according to claim 1, wherein at least one of said microporous core layer and said microporous adhesive layers comprises a metallocene catalyzed linear low density polyethylene.

10. A film according to claim 1, wherein said hydrophilic polymeric resin is selected from the group consisting of polyesters and polyamides.

11. A film according to claim 1, wherein said thermoplastic polymer comprises a polyolefin.

12. A film according to claim 1, wherein said thermoplastic polymer comprises a linear low density polyethylene.

* * * * *